(12) United States Patent
Saito

(10) Patent No.: US 6,636,696 B2
(45) Date of Patent: Oct. 21, 2003

(54) FUNDUS CAMERA

(75) Inventor: Setsuo Saito, Aichi-gun (JP)

(73) Assignee: Nidek Co., Ltd., Aichi (JP)

( * ) Notice: Subject to any disclaimer, the term of this patent is extended or adjusted under 35 U.S.C. 154(b) by 0 days.

(21) Appl. No.: 10/054,819

(22) Filed: Jan. 25, 2002

(65) Prior Publication Data

US 2002/0102099 A1 Aug. 1, 2002

(30) Foreign Application Priority Data

Jan. 31, 2001 (JP) ........................................ 2001-024610

(51) Int. Cl.[7] .................................................. A61B 3/14
(52) U.S. Cl. ......................... 396/18; 351/206; 351/208
(58) Field of Search ........................... 396/18; 351/206, 351/208, 200, 205, 211

(56) References Cited

U.S. PATENT DOCUMENTS

| 4,279,478 | A | * | 7/1981 | Matsumura | 351/206 |
| 4,286,289 | A | * | 8/1981 | Ottesen et al. | 341/20 |
| 4,558,932 | A | * | 12/1985 | Nunokawa | 351/206 |
| 4,756,613 | A | * | 7/1988 | Okashita | 351/206 |
| 6,273,565 | B1 | * | 8/2001 | Matsumoto | 351/210 |

FOREIGN PATENT DOCUMENTS

| EP | 1 183 992 A2 | 3/2002 | | |
| JP | B2 60-57855 | 12/1985 | | |
| JP | A 8-308802 | 11/1996 | | |
| JP | A 9-173298 | 7/1997 | | |
| JP | 09173298 A | * | 7/1997 | ............ A61B/3/14 |
| JP | A 11-169349 | 6/1999 | | |
| JP | A 2000-189387 | 7/2000 | | |

* cited by examiner

*Primary Examiner*—Russell Adams
*Assistant Examiner*—Michelle Nguyen
(74) *Attorney, Agent, or Firm*—Oliff & Berridge, PLC

(57) ABSTRACT

A fundus camera for photographing a fundus of an eye to be examined, in which a fixation target may be moved easily to guide a desired section of the fundus to a position intended for photographing. The fundus camera is provided with: observation means having a photographing element for picking up an image of the fundus illuminated in illumination light for observation and a monitor on which the picked-up image of the fundus is displayed; fixation target presenting means for movably presenting a fixation target in an arbitrary position, the fixation target being visually identified by the eye; designating means for designating a section of the fundus desired to be placed in the position intended for photographing on the fundus image displayed on the monitor; and control means for controlling the fixation target presenting means so as to shift a presenting position of the fixation target based on a signal indicating a designated position on the monitor.

7 Claims, 4 Drawing Sheets

FUNDUS CAMERA

BACKGROUND OF THE INVENTION

1. Field of the Invention

The present invention relates to a fundus camera for photographing a fundus of an eye to be examined.

2. Description of Related Art

For photographing a desired section of a fundus, hitherto known fundus cameras have been configured to use an operating member such as a lever to move an internal fixation target (a fixation light) into an arbitrary position for guiding a line of sight of an eye to be examined.

However, when a fixation target is to be moved in this manner, for example, for positioning a desired section of the fundus at a photographing center, during observation of the fundus, an examiner is required to manipulate a lever in response to movement of the fundus so as to bring the desired section to the photographing center. This makes it troublesome to guide a fundus to a position intended by an examiner.

SUMMARY OF THE INVENTION

The present invention has been made in view of the above circumstances and has an object to overcome the above problems and to provide a fundus camera in which a fixation target can be moved easily to guide a desired section of a fundus to a position intended for photographing.

To achieve the objects and in accordance with the purpose of the present invention, as embodied and broadly described herein, a fundus camera is provided with: observation means having a photographing element for picking up an image of the fundus illuminated in illumination light for observation and a monitor on which the picked-up image of the fundus is displayed; fixation target presenting means for movably presenting a fixation target in an arbitrary position, the fixation target being visually identified by the eye; designating means for designating a section of the fundus desired to be placed in a position intended for photographing on the fundus image displayed on the monitor; and control means for controlling the fixation target presenting means so as to shift a presenting position of the fixation target based on a signal indicating a designated position on the monitor.

In another aspect of the invention, the fundus camera is provided with: an observation optical system having an objective lens and a photographing element for picking up an image of the fundus illuminated in illumination light for observation, the photographing element being placed on an opposite side of the eye with respect to the objective lens; a fixation target presenting unit configured to be capable of shifting a presenting position of a fixation target to be presented to the eye; a monitor on which the picked-up image of the fundus is displayed, wherein designation of a position on its screen is permitted; and a control part which controls the fixation target presenting unit so as to shift the presenting position of the fixation target based on a signal indicating a designated position on the screen of the monitor.

Additional objects and advantages of the invention are set forth in the following description, are obvious from the description, or may be learned by practicing the invention. The objects and advantages of the invention may be realized and attained by means of instrumentalities and combinations particularly pointed out in the claims.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention. In the drawings.

DETAILED DESCRIPTION OF THE PREFERRED EMBODIMENTS

Figure 1:
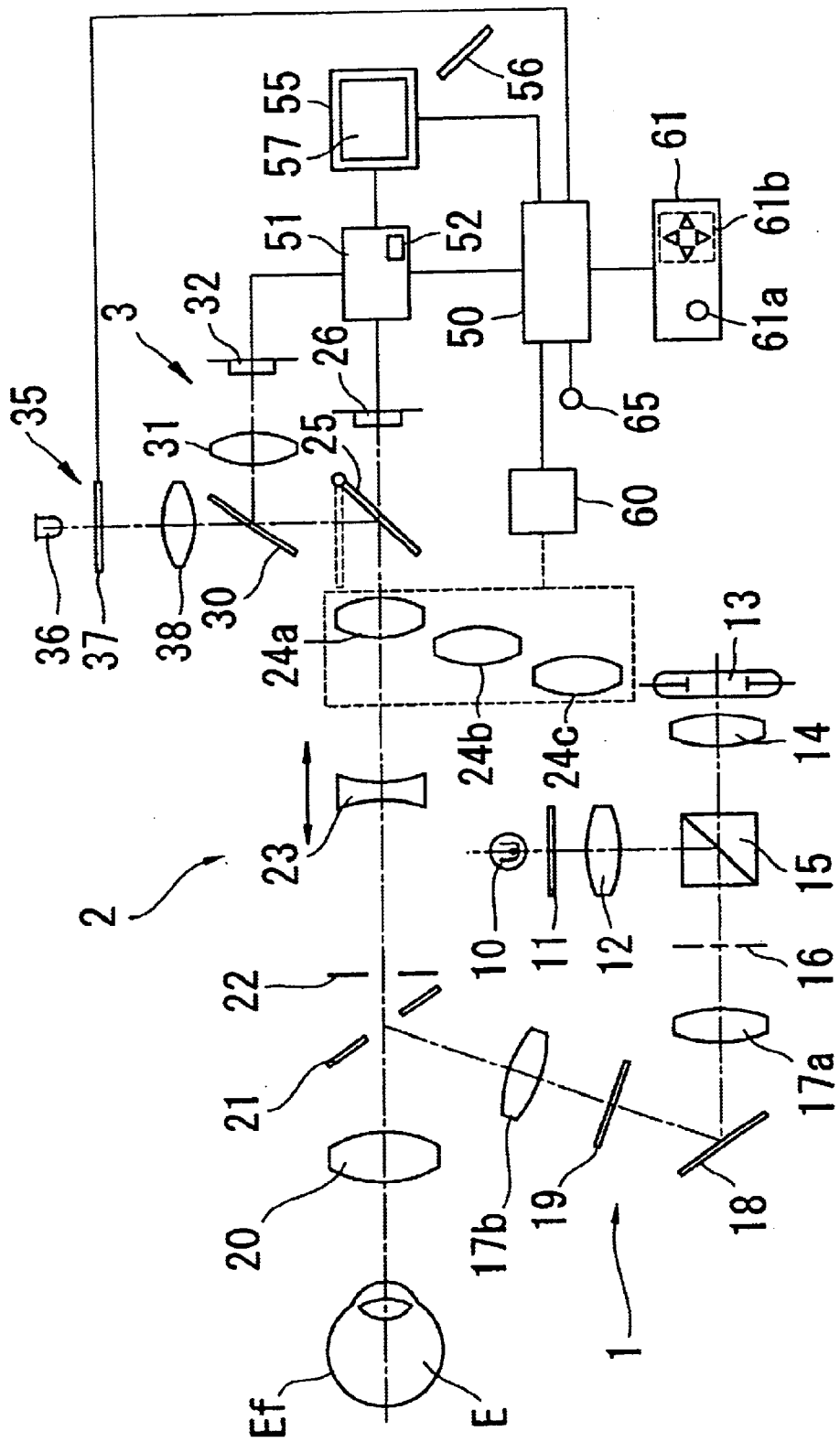
FIG. 1 is a view showing a schematic configuration of an optical system and a control system in a fundus camera according to the present invention.

A detailed description of a preferred embodiment according to the present invention will now be given referring to the accompanying drawings. FIG. 1 is a view showing a schematic configuration of an optical system and a control system in a fundus camera of non-mydriasis type consistent with the present invention. The optical system is roughly constituted of an illumination optical system 1, a photographing optical system 2, an observation optical system 3 and a fixation target presenting optical system 35.

<Illumination Optical System>

A halogen lamp 10 is a light source emitting illumination light for observation, which is converted into infrared illumination light by an infrared filter 11. The infrared illumination light then passes through a condenser lens 12 and is reflected by a half mirror 15 to illuminate a ring slit 16 having a ring-shaped aperture.

Incidentally, instead of the halogen lamp 10, an infrared light source such as an infrared LED may be used, which will eliminate the need of the filter 11. Also, instead of the half mirror 15, a dichroic mirror having a wavelength selectivity of reflecting infrared light and transmitting visible light may be used.

On the other hand, a flash lamp 13 is a light source emitting visible illumination light for photographing. After passing through a condenser lens 14, the visible illumination light is transmitted by the half mirror 15 to be made coaxial with the infrared illumination light, and then illuminates the ring slit 16.

After having passed through the slit 16, the illumination light (ring-slit light) forms an intermediate image in the vicinity of an aperture of an apertured mirror 21 via a relay lens 17a, a mirror 18, a black-dot plate 19 having a small black dot at its center, and a relay lens 17b. The illumination light (the ring-slit light) is then reflected to be coaxial with an optical axis of the photographing optical system 2. The illumination light (the ring-slit light) reflected by the mirror 21 passes through an objective lens 20 to form an image in the vicinity of the pupil of an eye E to be examined, and then is diffused to uniformly illuminate a fundus Ef of the eye E.

<Photographing Optical System>

Once forming an intermediate image of the fundus Ef via the lens 20, the light reflected from the fundus Ef enters a return mirror 25 through an aperture of a mirror 21, a photographing diaphragm 22, a focusing lens 23 movable in the direction of the optical axis, and one of photographing (imaging) lenses 24a, 24b and 24c. The return mirror 25 is placed in a position indicated by solid lines at the time of observation, and is placed in a position indicated by broken lines at the time of photographing. When the return mirror 25 is placed in the position of the broken lines, the visible light reflected from the fundus Ef is NOT reflected by the return mirror 25, thus entering a photographing color CCD camera 26 having a sensitivity to the visible region. As a result, a fundus image is formed on a photographing surface of the camera 26.

The lenses 24a, 24b and 24c are used for setting a photographing viewing angle to 60, 45 and 20 degrees, respectively. These lenses are held, for example, on a turret, and any one of them is inserted in the optical path through a photographing-lens shifting mechanism 60 in order to change a photographing magnification.

<Observation Optical System>

The observation optical system 3 shares the optical path of the photographing optical system 2 extending from the lens 20 to the return mirror 25. (The return mirror 25 is placed in the position of the solid lines except when photographing is done.) Reference numeral 30 represents a half mirror. Placed along an optical path in the reflecting direction of the half mirror 30 are a relay lens 31 and an observation CCD camera 32 having a sensitivity to the visible and infrared regions. When the return mirror 25 is placed in the position of the solid lines, the infrared light reflected from the fundus Ef is reflected by the return mirror 25, and is further reflected by the half mirror 30. The reflected light then enters the camera 32 via the lens 31, so that a fundus image is formed on a photographing surface of the camera 32.

<Fixation Target Presenting Optical System>

Figure 2:
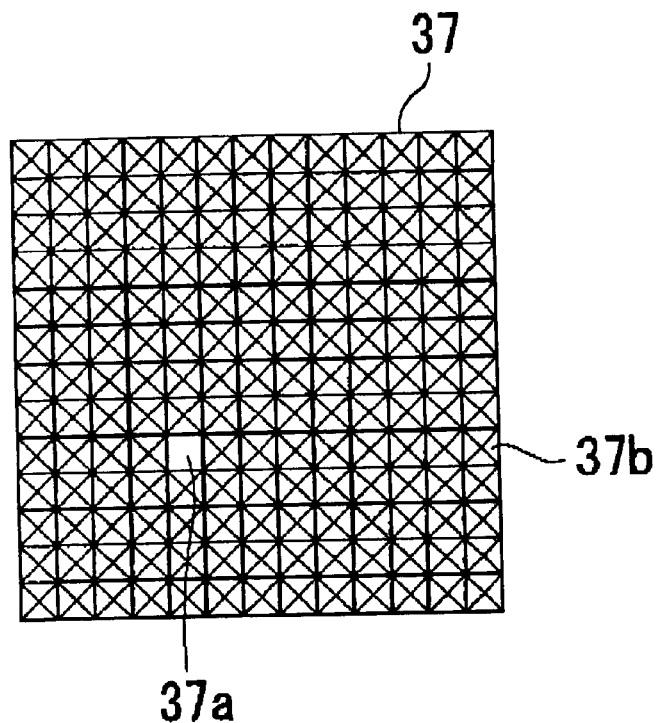
FIG. 2 is a view illustrating formation of a fixation target using a liquid crystal display.

The fixation target presenting optical system 35 is provided with a light source 36 for projecting a fixation targets a liquid crystal display (LCD) 37, and a relay lens 38. The system 35 shares the optical path of the observation optical system 3 extending from the return mirror 25 to the lens 20 via the half mirror 30. As shown in the FIG. 2, the LCD 37 consists of a plurality of cells, one of which corresponds to a light transmitting portion (an opening region) 37a, and the rest as a light shielding portion 37b. When illuminated by the light source 36, the light transmitting portion 37a serves as a fixation target for guiding a line of sight. The main control part 50 shifts the position of the light transmitting portion 37a, whereby the fixation target can be moved into an arbitrary position.

Figure 6:
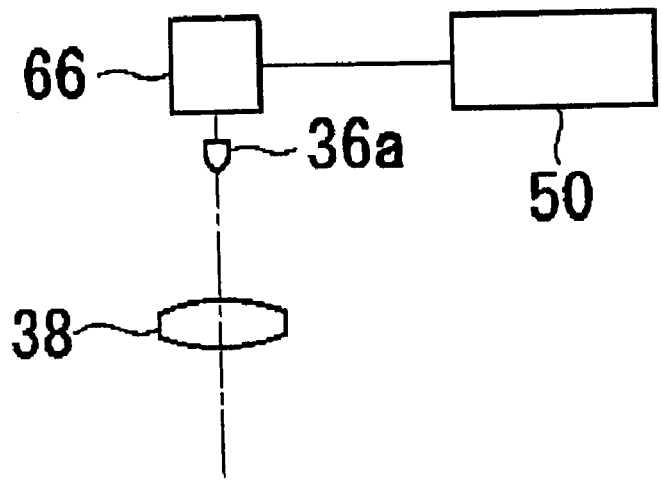
FIG. 6 is a view showing a modification for moving the fixation target.
Figure 7:
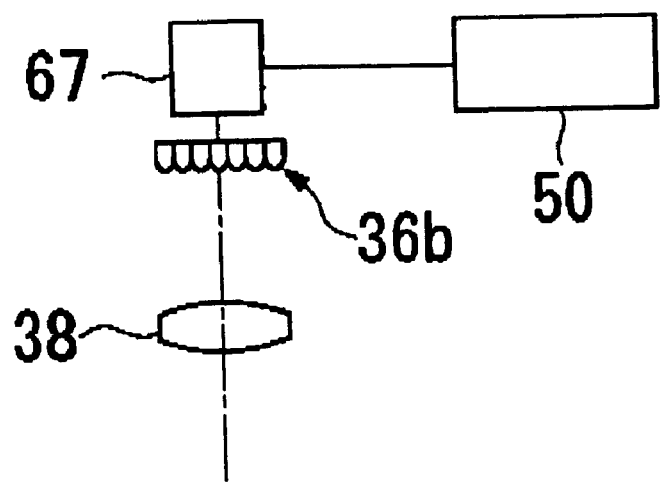
FIG. 7 is a view showing a modification for moving the fixation target.

Alternatively, different mechanisms using electric signals may be employed for moving the fixation target; for examples, it may be configured to control shifting of a point light source 36a by means of a shifting device 66 including a motor (see FIG. 6), or to control selective lighting of multiple LEDs 36b by means of a selective lighting device 67 (see FIG. 7).

<Control System>

Outputs from the cameras 32 and 26 are inputted to an image control part 51 which contains an image memory 52. The image control part 51 is connected to the main control part 50 controlling the entire system and to a dual-purpose monochrome and color monitor 55. The image control part 51 switches between the fundus image from the camera 32 (an image for observation) and the fundus image from the camera 26 (a photographed image), so that the two images are selectively displayed on the monitor 55. In addition, the monitor 55 is endowed with a touch panel mechanism 57, which enables an examiner to input necessary instructions to the main control part 50 with a touch on the screen using a touch pen 56. The main control part 50 is connected to the lens shifting mechanism 60, the LCD 37, a photographing switch 65, a control panel part 61 including a variety of control switches, and the like.

Descriptions will now be given to operations in an apparatus (a fundus camera) configured as described above. An examiner (photographer) faces an examinee toward the front of the fundus camera, and then lights the halogen lamp 10 to illuminate the fundus Ef in infrared illumination light. An image of the illuminated fundus Ef is obtained from the camera 32. The obtained image is transferred via the image control part 51, and is outputted for display on the monitor 55. While observing the image of the fundus Ef displayed on the monitor 55, the examiner operates an unillustrated operating means to perform alignment with the eye E, and to move the focusing lens 23 for achieving proper focus. Prior to photographing, the photographing viewing angle should be specified by a magnification selector 61a placed on the control panel 61. In response to selection signals from the selector 61a, the main control part 50 drives and controls the lens shifting mechanism 60 such that one of the lenses 24a, 24b and 24c may be placed in the optical path.

Figure 3:
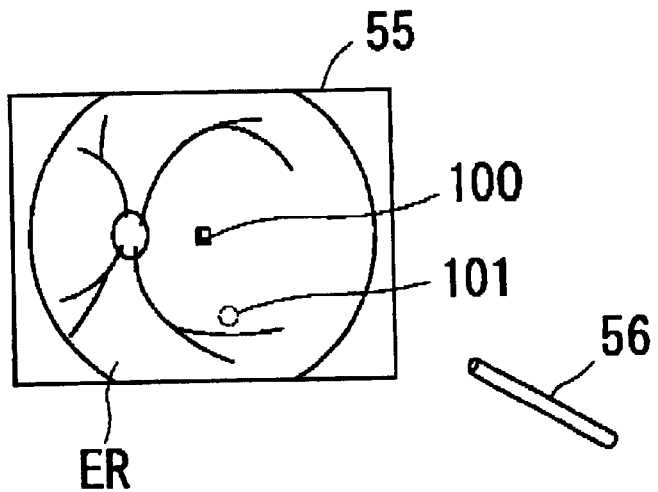
FIG. 3 is a view showing an example of a screen for observation.

On the other hand, the light source 36 is lit, and the light transmitting portion 37a of the LCD 37 is presented to the eye E as a fixation target for guiding the line of sight of the eye E. The position of the light transmitting portion 37a may be shifted using a movement switch 61b such as a cross key, and its positional information from the switch 61b is converted into electric signals. In consequence, as shown in FIG. 3, a character 100 is generated in a position based on that information, superposed on a fundus image ER displayed on the monitor 55. The image control part 51 generates the character 100, of which position is controlled by the main control part 50 receiving the input of movement signals from the switch 61b.

Here, when a section desired to be photographed, for example, a spot indicated by a broken circle 101 on the fundus image ER, is to be positioned at a photographing center (i.e. the center of the screen of the monitor 55, in the present embodiment), the examiner guides the line of sight of the examinee in the following manner; he manipulates the switch 61b for moving the character 100 to guide while he observes both the fundus image ER and the character 100 representing the fixation target which are displayed on the monitor 55.

However, in order to properly guide the desired section (the broken circle 101) to the photographing center as intended, it is required that the examiner be experienced in the manipulations for moving the fixation target in accordance with the movement of the fundus while considering in which direction and to what extent to move the fixation target. Moreover, it will take much time and effort if the examiner is unaccustomed to such operations.

Therefore, instead of the movement switch 61b, the touch pen 56 may be used to position the desired section (the broken circle 101) of the fundus image ER at the photographing center by indicating (designating) the position of the desired section with a touch. As a matter of course, a finger may be used for the touch instead of the touch pen 56. Alternatively, as is the case with a personal computer, a mouse may also be used to indicate (designate) the position of the desired section by moving a pointer shown on the screen to that position.

The position indicated (designated) by the touch pen 56 is detected through the touch panel mechanism 57 of the monitor 55, and position signals are inputted to the main control part 50. Based on the inputted position signals, the main control part 50 obtains coordinates of the indicated (designated) position relative to the center of the screen of the monitor 55, and then controls the shifting of the position of the light transmitting portion 37a being the fixation target.

Figure 4:
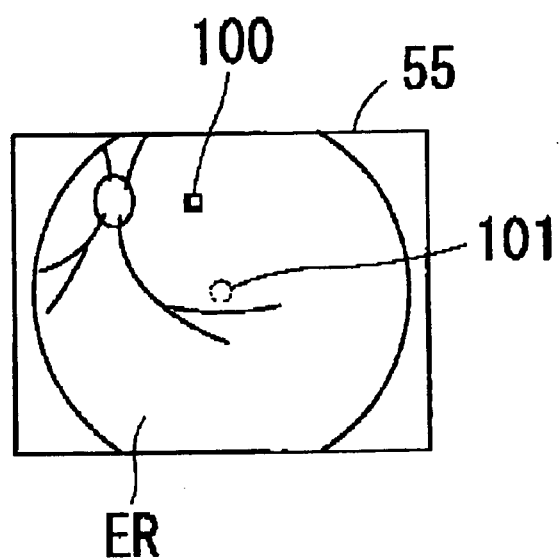
FIG. 4 is a view showing the screen for observation on which movement of the fixation target has guided a line of sight of an eye to be examined.

FIG. 4 depicts a screen display of the monitor 55 to be shown after the movement of the light transmitting portion 37a has guided the line of sight. Here, the character 100 is displayed in a position responsive to the movement of the light transmitting portion 37a. As described above, the fixation target may be moved easily to guide the line of sight in a proper way by simply indicating (designating) the desired section to be positioned at the photographing center on the screen of the monitor 55 where the fundus image ER is displayed.

It should be noted that, in the present apparatus, it is arranged that the photographing viewing angle be selected out of 20, 45 and 60 degrees to change the photographing magnification. Thus, information as to the photographing magnification is incorporated in determination of the position where the character 100 is displayed, and of a moving direction and a travel amount of the fixation target. If the photographing magnification is once changed midway through photographing actions, the main control part 50 subsequently shifts the light transmitting portion 37a to the center of the photographing optical axis so as to restore its default position. After that, the light transmitting portion 37a is shifted with reference to the position indicated (designated) by the touch pen 56.

If the desired section to be indicated (designated) on the monitor 55 is changed in sequence using the touch pen 56, the result might be that the fixation target (the light transmitting portion 37a) goes outside the field of view within which the eye E can be fixed. Another result might be that the indicated (designated) section of the fundus Ef violates the travel limit of the fixation target.

Figure 5:
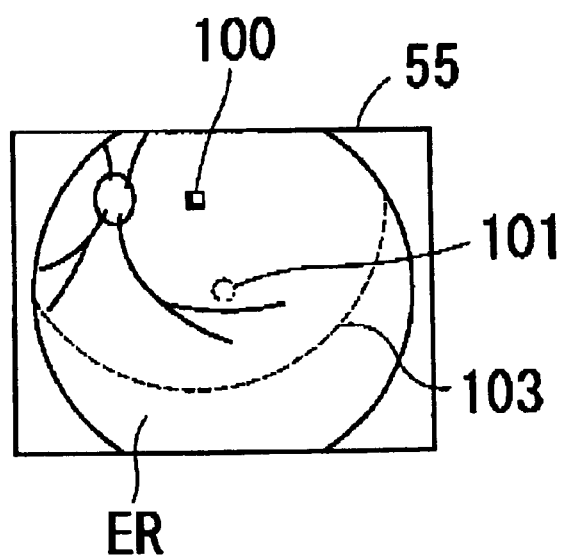
FIG. 5 is a view showing an example of informing an examiner of boundaries within which a desired section to be positioned at a photographing center can be indicated (designated)

To avoid such results, the image control part 51 displays a mark 103 in broken lines on the monitor 55 as shown in FIG. 5 so as to inform the examiner about the boundaries of a region where indication (designation) of the desired section is permitted, which is within both the travel limit of the fixation target and the field of view of the eye E. In FIG. 5, the side of the character 100 is the region where indication (designation) of the desired section is permitted. If any section outside this region is indicated (designated) with the touch pen 56, the main control part 50 brings up a message or sounds a beep as a warning. This facilitates recognition of the travel limit of the fixation target, making it possible to move the fixation target efficiently.

After the movement of the fixation target has guided the line of sight, the switch 65 is depressed to start photographing. After receiving signals from the photographing switch 65, the main control part 50 places the return mirror 25 in the position of the broken lines, and lights the flash lamp 13 to illuminate the fundus Ef in visible illumination light. The light reflected from the fundus Ef travels along the optical path of the photographing optical system 2 to enter the camera 26, thereby forming an image of the fundus Ef. Once image signals from the camera 26 are stored in the image memory 52 contained in the image control part 51, the screen display of the monitor 55 is shifted to bring up the still-frame image stored in the image memory 52.

As has fully been discussed so far, according to the present invention, a fixation target can be moved easily for the purpose of placing a desired section of a fundus in a position intended for photographing.

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A fundus camera for photographing a fundus of an eye to be examined comprising:

observation means having a photographing element for picking up an image of the fundus illuminated in illumination light for observation and a monitor on which the picked-up image of the fundus is displayed;

photographing means for photographing an image of the fundus illuminated in illumination light for photographing;

fixation target presenting means for movably presenting a fixation target in an arbitrary position, the fixation target being visually identified by the eye;

designating means for designating a position on the fundus image displayed on the monitor;

calculating means for calculating a coordinate position of the designated position with respect to a photographing center of the photographing means; and control means for controlling the fixation target presenting means to move a presenting position of the fixation target based on the obtained coordinate position so that a position of the fundus corresponding to the designated position moves to a photographing central part.

2. The fundus camera according to claim 1, further comprising informing means for informing on the monitor about a region where designation by the designating means is permitted.

3. A fundus camera for photographing a fundus of an eye to be examined comprising:

observation means having a photographing element for picking up an image of the fundus illuminated in illumination light for observation and a monitor on which the picked-up image of the fundus is displayed;

fixation target presenting means for movably presenting a fixation target in an arbitrary position, the fixation target being visually identified by the eye;

designating means for designating a section of the fundus desired to be placed in a position intended for photographing on the fundus image displayed on the monitor;

control means for controlling the fixation target presenting means so as to shift a presenting position of the fixation target based on a signal indicating a designated position on the monitor; and magnification changing means capable of changing a photographing magnification, wherein the control means controls the fixation target presenting means based on information about the photographing magnification.

4. A fundus camera for photographing a fundus of an eye to be examined comprising:

an observation optical system having an objective lens and a first photographing element for picking up an image of the fundus illuminated in illumination light for observation, the first photographing element being placed on an opposite side of the eye with respect to the objective lens;

a photographing optical system having a second photographing element for picking up an image of the fundus illuminated in illumination light for photographing, the second photographing element being placed on an opposite side of the eye with respect to the objective lens;

a fixation target presenting unit configured to be capable of shifting a presenting position of a fixation target to the presented to the eye;

a monitor on which a picked-up image of the fundus obtained by the first photographing element is displayed, wherein designation of a position on the fundus image displayed on its screen is permitted; and a control part which calculates a coordinate position of the designated position with respect to a photographing center of the second photographing element and controls the fixation target presenting unit to shift the presenting position of the fixation target based on the obtained coordinate position so that a position of the fundus corresponding to the designated position moves to a photographing central part.

5. The fundus camera according to claim 4, wherein the fixation target presenting unit includes a liquid crystal display.

6. The fundus camera according to claim 4, wherein the fixation target presenting unit includes at least one point light source.

7. The fundus camera according to claim 4, wherein the monitor includes a monitor of touch-panel type.

* * * * *